United States Patent [19]
Topping

[11] 3,864,527
[45] Feb. 4, 1975

[54] INTERCOMMUNICATION SYSTEM USING CONTROLLED GATES

[75] Inventor: Robert Topping, Port Glasgow, Scotland

[73] Assignee: James Henry Knox, Devon, England

[22] Filed: Dec. 8, 1972

[21] Appl. No.: 313,338

[30] Foreign Application Priority Data
Dec. 9, 1971 Great Britain .................... 57141/71

[52] U.S. Cl. .................... 179/38, 307/241, 307/259
[51] Int. Cl. .......................................... H04m 9/02
[58] Field of Search ......... 307/241, 259; 179/37, 38

[56] References Cited

UNITED STATES PATENTS

| | | | |
|---|---|---|---|
| 3,175,045 | 3/1965 | Bayer et al. | 179/37 |
| 3,230,397 | 1/1966 | Linder | 307/259 |
| 3,522,450 | 8/1970 | Muenter | 307/241 |
| 3,531,594 | 9/1970 | Dickerson | 179/37 |
| 3,641,365 | 2/1972 | Grant et al. | 307/241 |
| 3,737,672 | 6/1973 | Hill et al. | 307/202 |

*Primary Examiner*—William C. Cooper
*Assistant Examiner*—Mitchell Saffian
*Attorney, Agent, or Firm*—Cushman, Darby & Cushman

[57] ABSTRACT

A three port controlled gate and an intercommunication system incorporating the gate are disclosed. The gate is so formed that the control signals for opening the gate can be applied to the same port of the gate as the information signals to be passed therethrough, and in the most simple form comprises two diodes placed in opposition, the signals being applied to one of the free terminals and the output being taken from the other free terminal. The intercommunication system incorporating the gate utilises only three lines to interconnect the stations, one line to carry the gate opening signals, and the information signals, and two lines to carry the power to the stations.

13 Claims, 7 Drawing Figures

INTERCOMMUNICATION SYSTEM USING CONTROLLED GATES

BACKGROUND OF THE INVENTION

The present invention relates to electronic gates and particularly, though not exclusively to an electronic gate suitable for use in an intercommunication system which, by virtue of the gate, is of particularly simple and convenient construction. Various different electronic gating devices are already known, these may be either semiconductor devices or electronic valves themselves or circuit arrangements of components which together act as a gate.

When used with reference to a gate in this specification, the word 'open' will be understood to mean that the gate is arranged to transmit signals and the word "closed" will be understood to mean that the gate is arranged to block the transmission of signals. The term "open circuit" will, however, be used in its normal sense to indicate a break in a circuit, and the term "short circuit" will likewise be used in its normal sense to mean that a circuit or circuit element is by-passed by a less resistive route.

OBJECTS OF THE INVENTION

One object of the present invention is to provide a controlled gate which can be operated by control signals applied to the same input terminal as the information signals to be passed by the gate.

Another object of the invention is to provide a three port controlled gate which can be controlled by D.C. signals but which can at the same time operate to pass A.C. information signals.

Another object of the invention is to provide an intercommunication system requiring only three lines to interconnect all the stations of the system.

SUMMARY OF THE INVENTION

According to the present invention there is provided a three port controlled gate capable of transmitting signals in the form of voltage fluctuations within a given range in either direction between two of the ports thereof, the boundaries of the range being selectable within given limits by adjustably biasing one of the said two ports with respect to the third port.

The limits within which the said boundaries are independently selectable is narrower than the total range over which the said boundaries may be adjusted so that the range of voltage fluctuations passes when the gate is in any given adjustment is confined within relatively narrow limits which can be termed a transmission 'slot' in the available range of possible voltage fluctuations. In other words, although the width of the transmission 'slot' may be adjusted over a relatively narrow range, the position of the slot in the range of voltage fluctuations is nevertheless adjustable.

In one embodiment of the present invention the gate comprises a circuit including two rectifiers connected in opposition, the three ports being coupled respectively to the junction between the two rectifiers, and to the two free terminals thereof. The two rectifiers may be coupled with their anodes connected together or with their cathodes connected together, the polarity of the biasing being appropriately arranged so that, in operation, both rectifiers are conducting. If, for example, the cathodes of the rectifiers are connected together the anodes will each be positively biased with respect to the junction of the cathodes. The width of the transmission 'slot' is determined by the relative values of the biasing potentials of the two anodes with respect to the cathode junction, and the position of the transmission slot in the range of possible voltage fluctuations is determined by the absolute values of the biasing potentials of the anodes. It will be appreciated that the gate can be formed as a network from two semiconductor diodes, two valve rectifiers, two suitably arranged transistors, or alternatively may be formed as a circuit component by semiconductor techniques.

However it is formed the transmission of signals in the reverse direction through one of the rectifiers can be attributed, it is believed, to the internal resistance of the rectifier which, when conducting, operates over a limited range as a resistor. The limit of the voltage fluctuation which the device will transmit is determined by the voltage at which one of the rectifiers becomes reverse biased.

When used in a network the device should be associated with means for biasing the said one of the signal transmitting ports to the same polarity with respect to the third port, and the present invention comprehends a network including a three port controlled gate as defined herein together with means for biasing the said one of the signal transmitting ports to the same polarity with respect to the third port. It is preferred that such a network should include means for adjusting the biasing voltage of the said one of the signal transmitting ports to adjust the boundaries of the said range.

If it is desired that the width of the transmission slots should remain substantially constant over the voltage range the biasing means should preferably include a device operative as a constant current source which maintains constant the magnitude of the said range for different boundary values. In a preferred embodiment of the invention the said device operative as a constant current source is a collector follower coupled semiconductor device, although alternatively, if a valve network is used the said device operative as a constant current source is preferably an anode follower coupled valve.

It is preferred, in such a network, that the means for adjusting the biasing voltage of the said two ports with respect to the said third port includes an emitter follower coupled transistor operative to stabilise the said biasing voltage: similarly, if the network is a valve network it is preferred that the means for adjusting the biasing voltage of the said two ports with respect to the said third port includes a cathode follower connected valve operative to stabilise the said biasing voltage.

One valuable use for the controlled gate of this invention is that of providing a simple routing network which does not require a large number of wires in order to effect the routing of a voltage signal. Such a network may comprise a plurality of controlled gates as defined above each adjustable to a different biasing voltage so that voltage signals can be routed through different paths by adjusting a mean direct voltage level impressed on a signal line. The routine control can thus be effected on the same line as the signal since only one gate will pass the signal if all the gates are set to a different biasing voltage. This represents a considerable simplification over known systems where a separate line is required to control each gate, in addition to the signal line or lines. Such a network may include a plurality of respective acoustic transducers associated with each controlled gate, so as to be operative as an intercommunication system.

An intercommunication system of this type similarly has considerable advantages due to simplicity and the fact that only one signal and gating line is required in addition to the normal two power lines. In such a system the controlled gates are preferably all coupled by a common line and each controlled gate is associated with means for adjusting the direct voltage on the common line to select which of the other gates is operated. Thus when it is required to communicate to any station comprising a gate and associated transducer, (the called station) from any other station (the calling station), it is merely necessary to adjust the direct voltage applied to the common line by the calling station to that corresponding to the biasing voltage of the station to be called for the connection to be effected. In order to facilitate the calling procedure there may be provided a page gate associated with each control gate, all the page gates being biased to the same voltage so that all the associated acoustic transducers are operated on paging. This is particularly advantageous if it is desired to contact a particular person rather than a particular station since the person paged can then reply from any convenient station. This intercommunication system is thus eminently suitable for both home and office use.

There are preferably provided means associated with each gate for indicating when there is a direct voltage impressed on the common line, operative as an indication that the intercommunication system is in use. The one disadvantage of this system is that only one conversation can be conducted at any one time. It does have the advantage, however, of complete privacy since each station is effectively tuned to receive signals on only one level so that there is no possibility of a conversation being overheard or interrupted except by a higher voltage than that in use being impressed on the signal line, in which case the conversation would be cut off. The risk of this is minimised by the means for indicating that the system is in use which would have to be ignored when the subsequent higher voltage was applied. A relay could be provided to prevent interruption if this were found desirable.

In a preferred embodiment there is provided a ganged switch associated with each gate, the contacts of the ganged switch being operative to short circuit the said controlled gate and simultaneously to apply the selected voltage to the common line for transmission from the associated acoustic transducer. It should be noted that it is necessary for a calling station to identify itself so that the operator at the called station can select the appropriate voltage level for reply. Preferably the ganged switch further comprises contacts arranged to reverse the coupling of the acoustic transducer and the amplifier simultaneously with the application of the selected voltage to the common line and the short circuiting of the associated controlled gate. In this way, when the switch is operated to transmit, the amplifier terminals are automatically reversed so that the signal from the acoustic transducer is amplified, whereas the signal to the acoustic transducer is amplified when the station is arranged to receive the signals.

The means for applying the selected voltage to the common line may comprise a potential divider in the form of a continuously adjustable rheostat, although preferably the means for applying the selected voltage to the common line comprise a plurality of contacts arranged to selectively connect a plurality of series connected resistors between the power supply and the said common line.

In one embodiment, the above mentioned means for indicating that the line is in use comprise a discriminator sensitive to the voltage of the common line, and an indicator light which is illuminated upon operation of the said discriminator.

The disadvantage, mentioned above, of only being able to hold one conversation at any one time may be overcome by modifying the system to include means for applying a scanning waveform to the common line, the amplitude of the scanning waveform encompassing the range of different biasing voltages of the said plurality of controlled gates such that each gate is biased to its operating voltage during each cycle of the scanning waveform. The frequency of the scanning waveform should be sufficiently high for all the acoustic transducers to be in simultaneous operation without substantial loss of intelligibility of transmitted speech information.

Preferably the scanning waveform applied to the common line is a triangular waveform. This shape is preferred becasue it theoretically reduces the radiation from the system, which radiation might disturb nearby electronic equipment. Similarly it is preferred that the frequency of the scanning waveform is an ultrasonic frequency, although, again, the frequency should be as low as possible (while remaining in the ultrasonic frequency range) to minimise any radiation from the system.

Preferably, as in the previously discussed system, there are provided paging means associated with each controlled gate, the paging means comprising means for short circuiting the controlled gate and for coupling the acoustic transducer to the common line. It is unnecessary to select any voltage level, since the scanning waveform on the signal line will automatically open each of the gates in turn to distribute the signal to every receiving station in the network. In a preferred embodiment, which will be now discussed below, there is provided a filter associated with each gate, each filter being coupled between the respective controlled gate and acoustic transducer when the gate is coupled to receive signals along the common line.

Various other features and advantages of the invention will become apparent from a consideration of the following description with reference to the accompanying drawings, which is given purely by way of non-restrictive example.

DESCRIPTION OF THE ILLUSTRATED EMBODIMENTS

Figure 1:
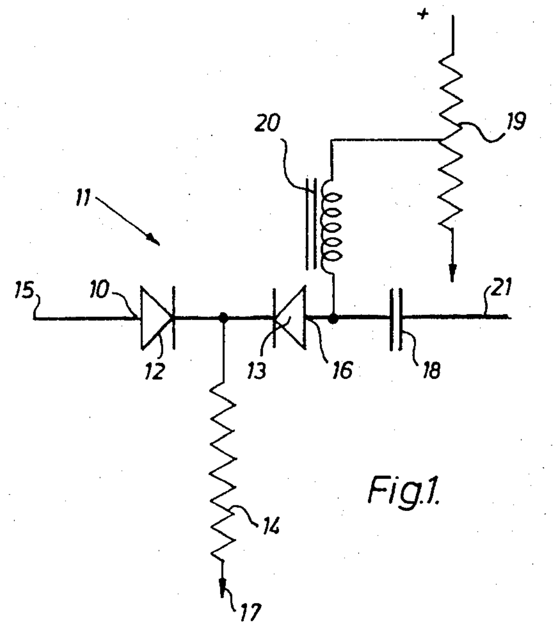
FIG. 1 is a circuit diagram illustrating one embodiment of the invention in a circuit suitable for use therewith.

Referring now to FIG. 1 there are shown a controlled three port gate generally indicated 11. The gate comprises two diodes 12 and 13 with their cathodes connected together and to a resistor 14. The three ports of the gate 11 thus comprise the anode 10 of the diode 12, the anode 16 of the diode 13, and the free end 17 of the resistor 14.

To the anode 16 of the diode 13 there is coupled a capacitor 18 and a biasing network comprising a potential divider 19 and an inductance 20. The free terminal 17 of the resistor 14 may, for example, be connected to a current sink such as the negative terminal of the power supply or to earth. The potential divider 19 is set to forward bias the diode 13 by a desired voltage. If it is desired to transmit voltage fluctuations from the anode 10 of the diode 12 through to the point 21 on the side of the capacitor 18 remote from the anode 16 of the diode 13 it is necessary to forward bias the diode 12 by substantially the same amount as the forward biasing of the diode 13. Both he diode 12 and the diode 13 are then carrying a substantial current and the voltage drop across each diode is determined inter alia by the internal resistance of the diodes. A fluctuation of the voltage applied to the anode 15 of the diode 12 will then be transmitted through to the anode of the diode 13 provided that the fluctuation is not sufficiently large to reverse bias either of the diodes, that is, a voltage increase large enough to reverse bias the diode 13 will not be transmitted, and a voltage decrease sufficiently large to reverse bias the diode 12 will not be transmitted.

Of course, it will be appreciated that the gate would work in exactly the same way if the diodes 12 and 13 were connected with their anodes together and to resistor 14, providing the biasing was suitably arranged, that is the resistor 14 and would have to be positively biased with respect to the cathodes of the two diodes. The capacitor 18 is provided for the transmission of alternating voltage signals and should be dispensed with if it is merely desired to transmit direct voltage signals.

Figure 2:
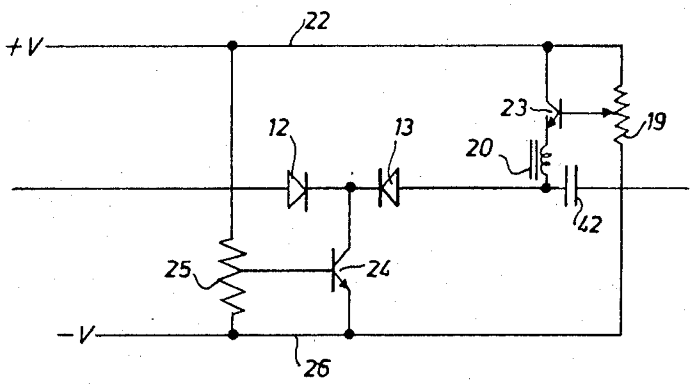
FIG. 2 is a circuit diagram illustrating a modified circuit incorporating the embodiment of FIG. 1.

Referring now to FIG. 2, there is shown a similar network which are arranged to avoid a disadvantage of the network illustrated in FIG. 1 which arises due to the fact that the limits of the voltage fluctuation, that is the width of the transmission "slot" which will be transmitted by the gate, depends on the value of the biasing voltage which is determined by the variable resistor 19. In the embodiment illustrated in FIG. 2 the two diodes 12 and 13 are again coupled together at their cathodes and the anode of diode 13 is biased via an inductance 20 from a positive potential line 22 via a transistor 23 which is coupled in emitter follower configuration to stabilise the biasing voltage, the base of the transistor 23 is fed from a variable resistor 19 which is connected between the positive supply line 22 and a negative supply line 26.

Similarly, the junction of the two cathodes of the diodes 12 and 13, instead of feeding a resistor directly to the negative supply, as in FIG. 1, is coupled to a transistor 24 the base of which is fed from a variable resistor 25 connected between the positive line 22 and the negative line 26. The transistor 24 is coupled in collector follower configuration to act substantially as a constant current source to maintain the current drain through the two diodes substantially constant despite changes in the biasing voltage which is adjusted by changing the base current of the transistor 23 by adjusting the variable resistor 19. The emitter follower configuration of the transistor 23 enables this to stabilize the variations of the voltage so that in this system the limits of the transmitted voltage fluctuations do not change with respect to each other at different biasing voltages.

Figure 3:
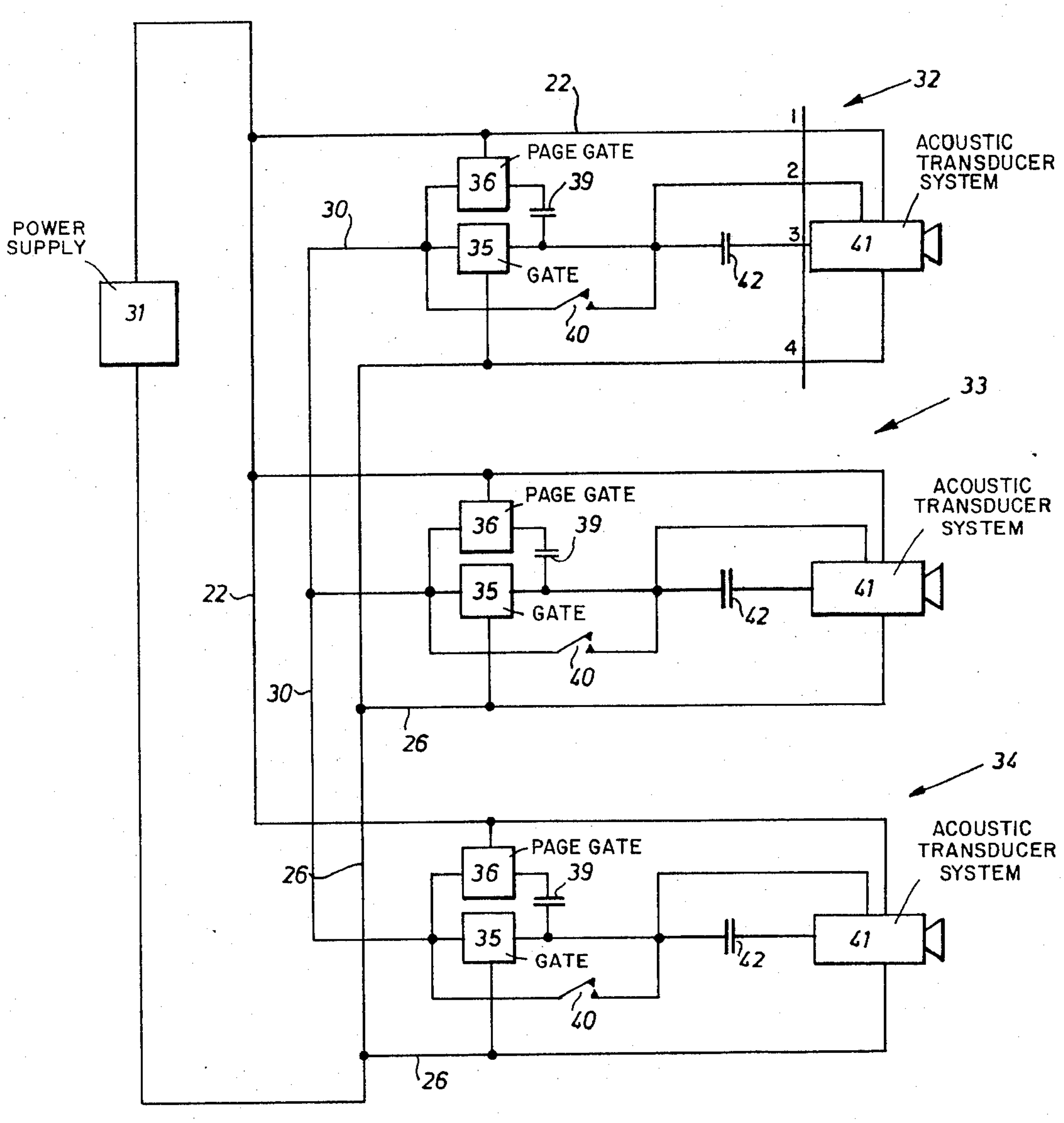
FIG. 3 is a block diagram illustrating one form of intercommunication system utilising the embodiment of FIG. 1.

Referring now to FIG. 3 there is shown, in block diagram form, an intercommunication system incorporating a plurality of controlled gates as illustrated in FIGS. 1 and 2. The intercommunication system comprises a common line 30 and a power line 22 which is fed from a power supply 31 which may be positive or negative, as described above, depending on whether the controlled gates are arranged to operate under positive bias or negative bias by coupling either the cathodes or the anodes together respectively. To the common line 30 there are connected a plurality of stations indicated generally by the arrows 32, 33 and 34. Each station is identical and comprises a normal gate 35 and a page gate 36 connected, at their transmission ports, in parallel with each other, in the common line 30. The third port of the normal gate 35 is coupled to the negative line 26, and the third port of the page gate 36 is coupled to the positive line 22. The page gate 36 is also coupled in series with a capacitor 39.

Bypassing both gates there is an on/off switch 40 which is in parallel with the two gates in the common line 30. The line 30 is then coupled to an acoustic transducer system 41 via a capacitor 42. The transducer system includes a direct current voltage selector which will be described in greater detail with respect to FIG. 4. Each of the gates 35 associated with each of the stations 32, 33 and 34 are set up to operate at a different biasing voltage so that if it is desired for one station, say the station 34 to communicate with another station, say the station 32, it is merely necessary for the appropriate d.c. voltageto be selected by means of the voltage selector, the switch 40 is then closed to short circuit the two gates 35 and 36 so that the selected d.c. voltage is applied to the common line 30. The audio signals can then be impressed onto the line 30 via the switch 40 by means of the transducer system 41.

The gate 35 of the called station 32 will automatically pass the signals due to the fact that the voltage on the common line 30 applied by the station 34 is the appropriate biasing voltage for this gate. Accordingly, the acoustic transducer system 41 of the station 32 produces acoustic vibrations corresponding to those input to the system 41 of the station 34. The gate 35 of the station 33 will pass no signals and accordingly the acoustic transducer system 41 of the station 33 will be silent.

Figure 4:
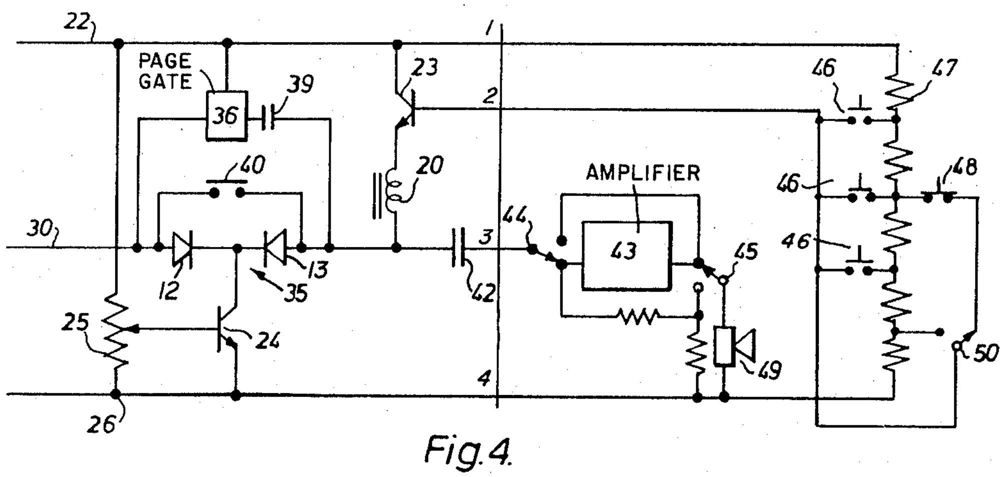
FIG. 4 is a more detailed circuit diagram of part of the embodiment of FIG. 3.

The circuit arrangement of the gate 35, the page gate 36, and the acoustic transducer system 41 is shown in detail in FIG. 4 where common integers are referred to by the same reference numerals as in FIGS. 2 and 3. The circuit comprises a gate 35, comprising two cathode connected diodes 12 and 13 coupled in a common line 30, and biased by means of an inductor 20 and collector follower transistor 23 coupled to a positive line 22, together with an emitter follower connected transistor 24 coupled to the cathode junction between the two diodes 12 and 13 and connected to a negative line 26.

The base of the transistor 24 is fed from a potential divider 25 connected across the positive line 22 and negative line 26. The gate 35 is coupled to an amplifier 43 via a capacitor 42 by means of the contacts 44 of a switch which also has contacts 40 which replace the on/off switch 40 of FIG. 3, and contacts 45 which are associated with the contacts 44 for reversing the connection of the amplifier 43 and which will be described in greater detail below. The ganged switch also includes voltage selecting contact set 46 which replace the variable resistor 19 of FIG. 2.

The contact set 46 comprises a plurality of contacts each coupled between respective resistors in a series connected chain 46 which is coupled between the positive line 22 and the negative line 26. Finally, the said ganged switch comprises a pair of contacts 48 which are normally closed and which couple the base of the transistor 23 to a point along the resistor chain 47 to determine the normal biasing voltage of the receiving station.

The amplifier 43 is connected via the switch 45 to one side of an acoustic transducer 49 the other side of which is coupled to the negative line 26.

When the syste is in the normal position, which is the position illustrated in FIG. 4, to which the above mentioned switch contacts are biased by means of a spring (not shown), a signal on the common line 30 will only pass the gate 35 when accompanied by a direct voltage determined by the position of the connection of the contacts 48 in the resistor chain 47. If the impressed voltage is correct, the signal is passed via the capacitor 42 to the contacts 44 of the ganged switch which, in the normal listen position as shown, are connected to the input of the amplifier 43. Similarly, in the listen position of the ganged switch, the contacts 45 connect the output of the amplifier 43 to the acoustic transducer 49, which therefore reproduces the signals transmitted along the line 30.

If it is desired to contact a particular person rather than a particular station the paging circuit may be operated. The paging network is not shown in detail in FIG. 4 but comprises a gate 36 which is biased in the same way as the gate 35, but to the highest voltage available to the network, so that the paging operation can override any other operation because the voltage on the line 30 will automatically be increased when the paging circuit is operated. The paging signal on the input line 30 will automatically be transferred via the gate 36 and capacitor 39 to the input of the amplifier 43 via the capacitor 42, and this will occur at all the stations of the network so that all acoustic transducers such as the transducer 49 will operate.

It will be appreciated that it is necessary for a caller to identify the station from which he is calling so that a person called may select the appropriate voltage in order to reply. This is achieved by operating the contacts 46 of the switch 40 to select the appropriate voltage on the potential dividing resistive chain 47, and at the same time to switch the contacts 45, 44 and 40 to the opposite positions. The normally open contacts 40 will then close, and the contacts 44 and 45 will switch so that the acoustic tranducer is coupled via the contact 45 to the input of the amplifier 43 and the output of the amplifier 43 is coupled via the contacts 44 to the capacitor 42. Since the switch 40 is closed the signal bypasses the gate 35 and accordingly is transmitted to the common line 30 with the impressed voltage selected by the contacts 46.

For domestic applications it may be convenient to provide a station at the front door which should conveniently be operable at the lowest voltage in the operating range. Similarly, it is preferable that any station can be set to "listen" to the front door station, as required, rather than the calling station providing the required voltage to select a given station. This may be achieved, as shown in FIG. 4, by means of a switch 50 which, in its normal position couples the switch 48 to the base of the transistor 23. This switch has a contact which couples the lowest resistor in the chain 47 to the base of the transistor 23 so that each station can also be switched to a subsidiary listen position to receive standard signals from the front door station.

Figure 5:
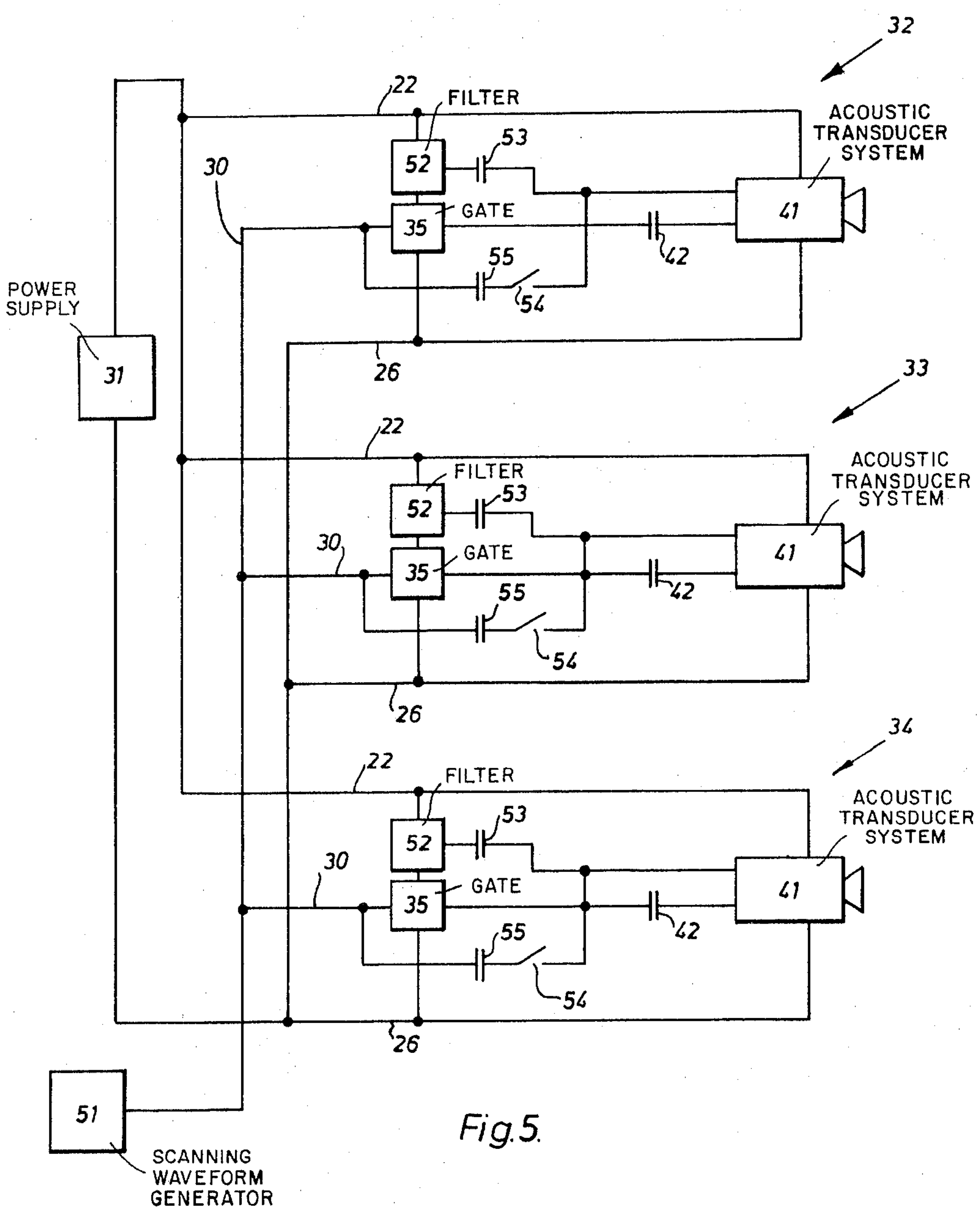
FIG. 5 is a second form of intercommunication system incorporating the embodiment of FIG. 1.

Referring now to FIG. 5 there is shown a block diagram of an alternative system, which may be termed a "dynamic" system. This system comprises a common line 30 to which a plurality of stations 32, 33 and 34 are connected. In this system, however, the common line is also coupled to a scanning system 51 which impresses onto the common line 30 a triangular waveform the amplitude of which is equal to the maximum range of the system.

Moreover one of the ports of each station such as the station 32 is connected to the associated acoustic transducer system 41 by two separate routes so that signals received along the line 30 can be transferred to the remainder of the station network in one of two ways as will be described below. One of the two separate routes includes a filter 52, which is coupled via a capacitor 53 to the acoustic transducer system 41 of the network. The other of the two routes includes a capacitor 42 coupled to the acoustic transducer system 41. The system 41 includes a direct voltage gate selecting network which will be described below, which is coupled to a paging switch 54 in series with a capacitor 55 two signal transmitting ports of the gate 35, the third port being used merely as a biasing terminal.

Figure 6:
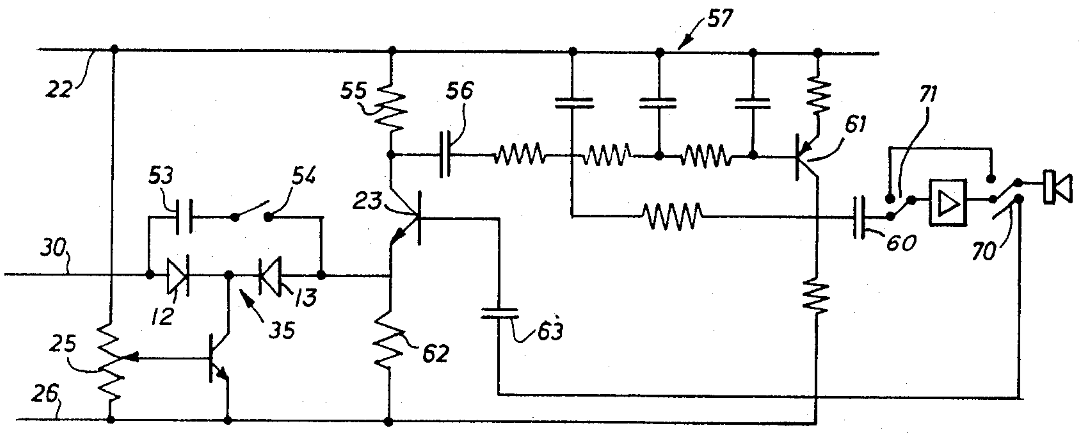
FIG. 6 is a more detailed circuit diagram of part of the embodiment of FIG. 5.

The arrangement of each station is shown in greater detail in FIG. 6 where, again, like reference numerals refer to corresponding components. In the embodiment illustrated in FIG. 6 a gate 35 comprising two diodes 12, 13 is coupled to the common line 30 but the anode of the diode 13 is coupled between the emitter of a transistor 23 and a resistor 62 which is coupled to the negative line 26. The collector of the transistor 23 is coupled via a resistor 55 to the positive line 22 and the base of the transistor 23 is coupled via a capacitor 63 to a contact 70 of a ganged switch 71 which operates to reverse the connection of the amplifier 43 as described with reference to FIG. 4. A direct voltage selection network which corresponds to the network 47 illustrated in FIG. 4 is connected between the base of the transistor 23 and the capacitor 63 and is not shown in detail in FIG. 6. A pulse repetition frequency filter, generally indicated 57 is coupled to the collector of the transistor 23 and via a capacitor 60 to the amplifier of the acoustic transducer system. The pulse repetition frequency filter is necessary because of the high level "carrier" to modulation ratio of the scanning waveform with respect to the desired transmitted signals. The filter preferably has a supression of greater than 45 decibels at 20 KHz to demodulate the scanning waveform frequency.

In this system it is only necessary to provide a switch 54 and capacitor 53 in parallel with the gate 35 to provide a paging facility since the scanning waveform will distribute a paging signal to all stations of the network. The system described with reference to FIG. 6 operates in a similar manner to that of FIG. 4 except that the line 30 is periodically passed through the voltage range at which the gate 35 is open to transmit signals so that the output of to the acoustic transducer from the capacitor 60 will be periodic. Any modulation of the carrier waveform on the line 30 will thus be transmitted while the gate 35 is biased to its open state, and similarly when the direct voltage selector is used to transmit signals, unlike the arrangement of FIG. 5 where the gate 35 is bypassed to transmit, the biasing of the gate 35 must be adjusted so that the gate 35 operates at the same biasing level as the gate of the station to which it is desired to transmit so that the gate superimposes signals into the transmitting waveform at the appropriate voltage level.

The advantage of this system is that a plurality of conversations can simultaneously take place at different voltage levels on the same line without interferring with each other although fewer stations can be provided than with the "static" network described with reference to FIGS. 3 and 4 since the number of stations is limited by the available range of biasing voltages and the width of the voltage range over which each gate is open (the transmission "slot" of each gate). However, for small office installations, or for home use, the network provides considerable advantages over conventional systems due to the simplification and the smaller number of wires required.

Figure 7:
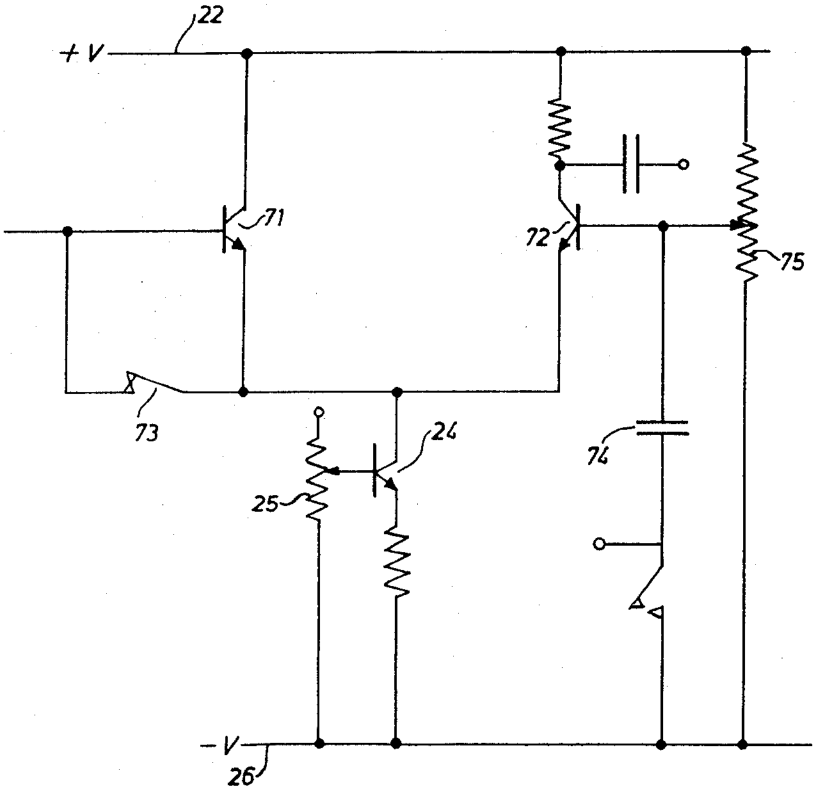
FIG. 7 is a circuit diagram illustrating an alternative embodiment of the invention.

Referring now to FIG. 7, an alternative gate circuit is shown. This circuit comprises a pair of NPN transistors 71, 72 in common emitter configuration.

The collectors of each of the transistors 71, 72 are coupled to the positive line 22 and the emitters of both transistors 71, 72 are coupled to the collector of the emitter follower transistor 24, which fulfils a corresponding function to that of the transistor 24 of FIG. 2.

The emitter-base junction of the transistor 71 is bypassed by a switch 73, when the contacts of this switch are closed, in order to determine the transmitting mode of the gate. In this mode the audio input signals are applied via a capacitor 74 to the base of the transistor 72 the biasing potential of which is adjustable by means of a rheostat 75.

In the receive mode of the gate, with the contacts of the switch 73 open, the audio output signal is taken from the collector of the transistor 72, via a capacitor 76. In this embodiment the appropriate junctions of the transistors 71, 72 provide the rectifying effect on which the operation of the gate is dependent.

I claim:

1. A network incorporating a plurality of three port controlled gates each comprising respective first and second unidirectionally conductive elements connected together with their conduction directions in opposition, respective first biasing means biasing said first unidirectionally conductive elements to their conduction states, each by a different selected voltage, a common signal line interconnecting all said second unidirectionally conductive elements, means for applying signals to said common signal line, and adjustable second biasing means for applying a selected voltage to said common signal line, whereby signals applied to said common signal line by said signals applying means are passed by whichever of said controlled gates has a first unidirectionally conductive element biased, by the associated said first biasing means, by a voltage matching that of said selected voltage applied by said second biasing means, the remaining gates blocking said signals.

2. The network of claim 1 wherein said plurality of controlled gates are each coupled to respective amplifiers and associated acoustic transducers of representive stations of an intercommunication system.

3. The intercommunication system of claim 2 wherein each said station includes adjustable biasing means for applying a selected biasing voltage to said common line such that signals impressed on said common line via said acoustic transducer of said station are passed by the controlled gate of a selected one of the other stations of said system.

4. The intercommunication system of claim 3 wherein each said station includes a second three port controlled gate operative as a page gate, means biasing said page gates of all said stations by the same voltage such that when this voltage is impressed on said common line all said page gates pass signals impressed on said common line.

5. The intercommunication system of claim 3 wherein at least some stations are provided with means sensitive to the voltage on said common line, said voltage sensitive means operating to indicate when a working voltage is applied to said common line to provide a line busy indication.

6. The intercommunication system of claim 3 wherein each station includes a ganged switch interconnecting said common line, said three port controlled gate of the station, and said adjustable biasing means of said station, said ganged switch having a first position wherein said station is in a receive mode in which said common line is connected to said three port controlled gate, and said three port controlled gate is connected to said amplifier, and a second position wherein said station is in a transmit mode, in which said three port controlled gate is short circuited, and said adjustable biasing means are connected directly to said common line.

7. The intercommunication system of claim 6 wherein said ganged switch of each station is also connected to said amplifier of said station and said acoustic tranducer of said station, whereby in said first position said acoustic transducer is coupled to the output of said amplifier and said input of said amplifier is coupled to said common line, and in said second position said acoustic transducer is coupled to said input of said amplifier and said output of said amplifier is coupled to said common line.

8. The intercommunication system of claim 3 wherein said adjustable biasing means of each station comprises a chain of resistors connected to the power source of said system, and a plurality of contacts for connecting a selected number of said resistors in series with said common line.

9. The intercommunication system of claim 5 wherein said voltage sensitive line busy indicator comprises a voltage discriminator connected to said common line and to an indicator light which is illuminated when an operating voltage is applied to said common line.

10. The intercommunication system of claim 2 wherein there are provided means for applying a scanning waveform to said common signal line, the amplitude of said waveform encompassing the range of different biasing voltages of said plurality of controlled gates of said stations whereby each gate is biased at least once to its operating voltage during each cycle of said scanning waveform.

11. The intercommunication system of claim 10 wherein said scanning waveform applying means operates to produce a triangular waveform.

12. The intercommunication system of claim 10 wherein each said station is provided with paging means for transmitting a paging signal, comprising means for coupling said acoustic transducer and said associated amplifier of said station to said common line whereby said paging signal is distributed at all said voltage levels of said scanning waveform.

13. The intercommunication system of claim 10 wherein each said station includes filter means, and means coupling said filter between said three port controlled gate of said station and said associated acoustic transducer means of said station when said station is in said receive mode.

* * * * *